United States Patent [19]

Nakamura et al.

[11] 4,260,920
[45] Apr. 7, 1981

[54] MULTI-POLE PERMANENT MAGNET ROTOR

[75] Inventors: Tsutomu Nakamura, Toyokawa; Teruo Umehara, Hanyu, both of Japan

[73] Assignees: Hitachi, Ltd.; Hitachi Metals, Ltd., both of Japan

[21] Appl. No.: 943,124

[22] Filed: Sep. 18, 1978

[30] Foreign Application Priority Data

Sep. 19, 1977 [JP] Japan .............................. 52/111646

[51] Int. Cl.³ ........................................... H02K 21/12
[52] U.S. Cl. ................................. 310/156; 310/49 R; 310/268; 310/68 R
[58] Field of Search ............... 310/156, 268, 164, 163, 310/162, 46, 49 R, 68 R

[56] References Cited

U.S. PATENT DOCUMENTS

| 4,093,897 | 6/1978 | Fujita et al. ..................... 310/268 X |
| 4,109,170 | 8/1978 | Fujita et al. ..................... 310/268 X |

Primary Examiner—Mark O. Budd
Attorney, Agent, or Firm—Craig & Antonelli

[57] ABSTRACT

A disk-shaped magnet attached to a rotary shaft is circumferentially segmented into a plurality of segments which are magnetized to form driving magnetic poles. A plurality of velocity detecting magnetic poles are also arranged on the disk-shaped magnet concentrically to the driving magnetic poles. The number of the velocity detecting magnetic poles is larger than the number of the driving magnetic poles to increase the frequency of an output signal of a velocity detecting coil which interlinks with the velocity detecting magnetic poles so that a response speed of a velocity control circuit is increased.

9 Claims, 3 Drawing Figures

MULTI-POLE PERMANENT MAGNET ROTOR

BACKGROUND OF THE INVENTION

The present invention relates to a motor having an axial magnetic gap, and more particularly to a motor adapted to be used in a disk record player or a magnetic tape recorder in which the rotating speed of a rotor magnet is sensed to control the rotating speed of the rotor magnet.

In the motor used in the disk record player which plays back a disk record and the magnetic tape recorder/player which records a signal on a magnetic tape and plays it back, it is required to rotate a turntable and a pinch roller at constant speeds and hence it is necessary to control the rotating speed of the motor.

In order to maintain the rotating speed of the motor constant, the rotating speed of the motor may be converted to a voltage signal or frequency signal, which is then compared with a reference voltage or frequency to increase or decrease the rotating speed of the rotor in accordance with a difference between the signals.

A motor has been proposed, which uses a multi-pole magnet as the rotor and a velocity detecting coil arranged in a magnetic field of the multi-pole magnet to interlink with magnetic fluxes of the multi-pole magnet so that the rotating speed of the multi-pole magnet is converted to an A.C. signal. Such a motor is disclosed in detail in Japanese Patent Application Laid-Open No. 51510/77, laid open on Apr. 25, 1977 (corresponding to Japanese Patent Application No. 127768/75, U.S. Patent Application Ser. No. 735,032 filed on Oct. 22, 1976, now U.S. Pat. No. 4,093,897 and German Patent Application No. P2647675.5 filed on Oct. 21, 1976). This motor has a disk magnet attached to a rotary shaft, which disk magnet is magnetized in the direction of the thickness and circumferentially segmented into eight poles with each pole being magnetized in opposite polarity to adjacent poles. A pair of drive coils wound in a star-shape are arranged to face the multi-pole magnet and the velocity detecting coil is arranged to face the multi-pole magnet between the drive coils and the multi-pole magnet. In this motor, the pair of drive coils and the velocity detecting coil are fixed and a magnetic gap is provided in the direction of the axis around which the multi-pole magnet rotates. The velocity detecting coil includes a plurality of radially extending series-connected generating element wires, each of which interlinks with the magnetic flux of each magnetic pole of the multi-pole magnet to produce the velocity detecting signal having a frequency representative of the rotating speed of the multi-pole magnet. However, since the velocity detecting coil interlinks with the magnetic fluxes of the eight magnetic poles of the multi-pole magnet to produce the velocity signal, the frequency of the velocity signal is too low. For example, when this motor is used in the disk record player to directly drive the turntable, the velocity signal has a frequency of 20 Hz if the number of the generating element wires of the velocity detecting coil is equal to 72 and the rotating speed of the turntable is equal to 33⅓ r.p.m. Accordingly, a response speed of a velocity control circuit which processes the velocity signal is slow. The velocity control circuit converts the velocity signal to a D.C. voltage which ia representative of the frequency of the velocity signal and compares the D.C. voltage with a reference voltage from a reference voltage source and controls a drive current supplied to the drive coils in a manner to reduce the difference between those voltages. However, since the frequency of the velocity signal is low, a time contant of a low-pass filter to which the velocity signal is fed is large and hence the response speed of the velocity control circuit is low.

In order to raise the frequency of the velocity signal, the number of the generating element wires of the velocity detecting coil may be increased. In this case, however, a space between adjacent element wires becomes so narrow that signals may be produced simultaneously in the adjacent element wires, resulting in the reduction of the output voltage of the velocity signal.

SUMMARY OF THE INVENTION

It is an object of the present invention to provide a motor which produces a velocity signal having a higher frequency.

It is another object of the present invention to provide a motor which produces a velocity signal having a larger output voltage and a higher frequency.

The motor in accordance with the present invention has a disk-shaped multi-pole magnet attached to a rotary shaft, which multi-pole magnet includes a plurality of driving magnetic poles which are circumferentially segmented and magnetized and a plurality of velocity detecting magnetic poles which are circumferentially segmented and magnetized around an outer periphery of the driving magnetic poles. The rotary shaft is rotatably mounted to a yoke plate which is spaced from the disk-shaped magnet so that an air-gap is formed between the magnet and the yoke plate. Disposed within the air gap are a pair of driving coils which are molded in star-shape and angularly displaced from each other by an electrical angle of 90°. Further disposed within the air gap is a velocity detecting coil which interlinks with magnetic fluxes of the velocity detecting magnetic poles so that the velocity detecting coil produces a velocity signal of a frequency representative of the rotating speed of the multi-pole magnet.

The plurality of driving magnetic poles and the plurality of velocity detecting magnetic poles are arranged in a common plane on the multi-pole magnet and they are magnetized in the direction of the thickness of the multi-pole magnet. The driving magnets include, for example, eight circumferentially segmented magnetic poles which are arranged near the center of the disk-shaped magnet, with each magnetic pole being magnetized in opposite polarity to adjacent magnetic poles. The velocity detecting magnetic poles are segmented circumferentially of the disk-shaped magnet around the outer periphery of the driving magnetic poles, with each magnetic pole being magnetized in opposite polarity to adjacent magnetic poles. Each of the velocity detecting magnetic poles is magnetized in a smaller area than the driving magnetic pole, and there are more velocity detecting magnetic poles, e.g. 200 magnetic poles, than the driving magnetic poles. The velocity detecting coil includes a plurality of radially extending generating element wires which interlinks with the magnetic fluxes of the velocity detecing magnetic poles and the generating element wires are connected in series to each other to produce a velocity signal therein.

DESCRIPTION OF THE PREFERRED EMBODIMENTS

Figure 1:
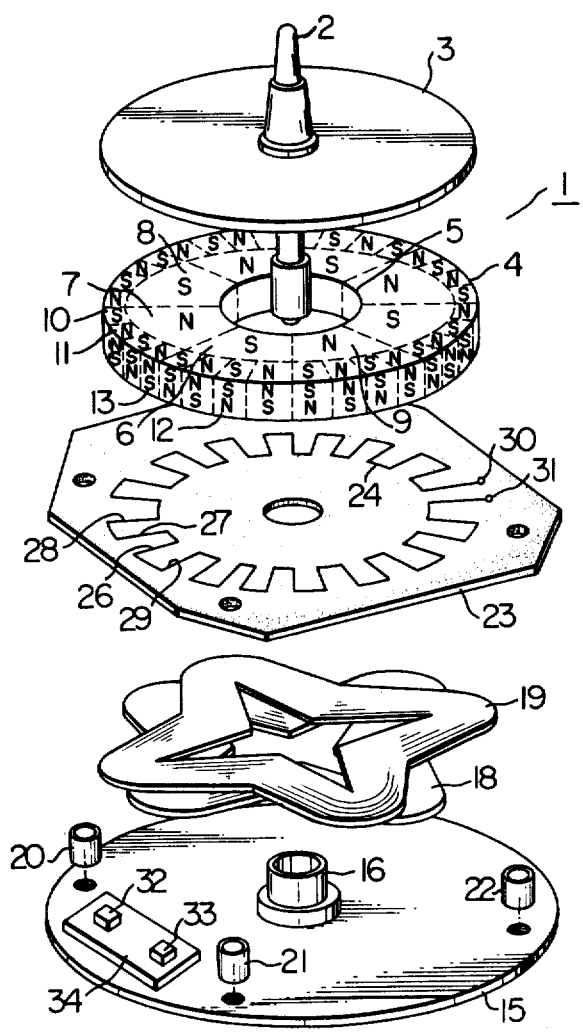
FIG. 1 is a perspective exploded view of a motor in accordance with the present invention.
Figure 2:
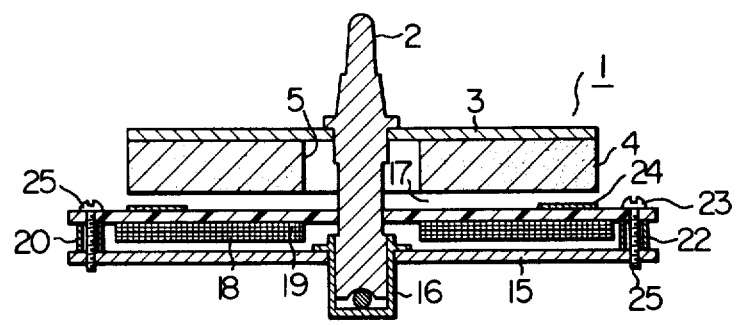
FIG. 2 is a sectional view of the motor of the present invention.

FIG. 1 shows one embodiment of the motor of the present invention, illustrated in an exploded form, and FIG. 2 shows a sectional view thereof. The motor 1 has a rotary shaft 2 to which a disk-shaped rotor plate 3 made of magnetic material is attached. The rotor plate 3 has a central bore into which the rotary shaft 2 is fitted to mechanically couple to each other. A disk-shaped rotor magnet 4 is secured to a lower side of the rotor plate 3. The magnet 4 is made of a ferrite and has a big central hole 5 into which the rotary shaft 2 is inserted. The magnet 4 is provided with a plurality of driving magnetic poles 6, 7, 8, . . . 9 around the hole 5. The plurality of driving magnetic poles 6, 7, 8, . . . 9 are segmented circumferentially of the magnet 4 and magnetized in the direction of the thickness of the magnet 4. Each of the magnetic poles is magnetized in opposite polarity to adjacent magnetic poles. In the embodiment shown in FIGS. 1 and 2, the magnet 4 is segmented into eight poles which are magnetized to constitute the driving magnetic poles 6, 7, 8, . . . 9. Each of the driving magnetic poles is magnetized in the direction of the thickness of the magnet 4. It is magnetized such that where an upper side of the magnetic pole 6 is magnetized in S-pole a lower side thereof is magnetized in N-pole while upper side of the magnetic pole 7 arranged to the left of the magnetic pole 6 and upper side of the magnetic pole 9 arranged to the right of the magnetic pole 6 are magnetized in N-pole and lower sides of the magnetic poles 7 and 9 are magnetized in S-pole. The magnet 4 is further provided with a plurality of velocity detecting magnetic poles 10, 11, 12, . . . 13 which are concentrically arranged around outer periphery of the driving magnetic poles 6, 7, 8, . . . 9 respectively and magnetized in the direction of the thickness of the magnet 4 in the polarity of N-S or S-N like in the case of the driving magnetic poles 6, 7, 8, . . . 9 and segmented circumferentially. In the illustrated embodiment, the magnet 4 has 32 circumferentially segmented velocity detecting magnetic poles. Like the driving magnetic poles 6, 7, 8, . . . 9, each of the velocity detecting magnetic poles 10, 11, 12, . . . 13 is magnetized in opposite polarity to adjacent magnetic poles. The driving magnetic poles 6, 7, 8, . . . 9 and the velocity detecting magnetic poles 10, 11, 12, . . . 13 are concentrically magnetized in a common plane on the disk-shaped ferrite core to form the disk-shaped multi-pole rotor magnet 4.

The rotary shaft 2 is inserted into a bearing 16 mounted at the center of a disk-shaped yoke plate 15 and rotatably supported thereby. The yoke plate 15 is made of magnetic material and it is spaced from the lower side of the magnet 4 when the rotary shaft 2 is inserted into the bearing 16, to define a magnetic air gap 17 between the yoke plate 15 and the magnet 4. Disposed within the air gap 17 are first and second star-shaped driving coils 18 and 19, each of which is manufactured by winding a copper wire approximately 60 turns in the shape of a square and bending centers of four sides of the square inwardly to form a star-shape. The driving coils 18 and 19 are angularly displaced from each other by an electrical angle of 90° or a mechanical angle of 22.5°. Disposed on an upper side of the yoke plate 15 are washers 20, 21 and 22, on which an insulative base plate 23 made of synthetic resin is mounted. The base plate 23 and the washers 20, 21 and 22 are fixed to the yoke plate 15 by bolts 25 which extend from an upper side of the base plate 23 to the lower side of the yoke plate 15. The driving coils 18 and 19 are bonded to a lower side of the base plate 23. Disposed on the upper side of the base plate 23 is a velocity detecting coil 24 which has a plurality of generating element wires 26, 27, 28, . . . 29 extending radially outward from the center of the base plate 23. Each of the generating element wires 26, 27, 28, . . . 29 is connected in series to others with an inner end of one wire being connected to an outer end of the adjacent wire to form a pair of output terminals 30 and 31. Each of the generating element wires 26, 27, 28, . . . 29 extends inward from the outer periphery of the magnet 4 and has a length substantially equal to a radial length of each of the velocity detecting magnetic poles of the magnet 4. The velocity detecting coil 24 is formed by printing it on the upper side of the base plate 23.

Disposed on the upper side of the yoke plate 15 are a pair of Hall effect elements 32 and 33 which are mounted on an insulative board 34 and arranged around the center of the rotary shaft 2 to be angularly displaced from each other by an electrical angle of 90° or a mechanical angle of 22.5° and to interlink with magnetic fluxes of the driving magnetic poles 6, 7, 8 . . . 9. The insulative board 34 is bonded to the yoke plate 15.

The motor shown in FIGS. 1 and 2 has the axial air gap between the magnet 4 and the pair of opposing driving coils 18 and 19. The magnetic fluxes of the driving magnetic poles of the magnet 4 interlink with the pair of driving coils 18 and 19. When drive currents are supplied to the pair of driving coils 18 and 19, they generate driving magnetic fluxes which interact with the magnetic fluxes of the driving magnetic poles 6, 7, 8, . . . 9 to rotate the magnet 4.

The plurality of generating element wires 26, 27, 28, . . . 29 which constitute the velocity detecting coil 24 interlink with the magnetic fluxes of the velocity detecting magnetic poles 10, 11, 12, . . . 13 of the magnet 4. Therefore, as the magnet 4 rotates, magnetic flux densities and polarities of the magnetic fluxes which pass across the generating element wires 26, 27, 28, . . . 29 change so that voltages are developed across the generating element wires 26, 27, 28, . . . 29. Since the generating element wires 26, 27, 28, . . . 29 are connected in series to each other, the generated voltages are added together and appear across the pair of output terminals 30 and 31 as a velocity signal. Since the polarity of the voltage generated across each generating element wire changes when the polarity of the magnetic flux passing thereacross changes, the velocity signal appearing across the output terminals 30 and 31 is an A.C. signal which has a frequency representative of the rotating speed of the magnet 4. The frequency of the velocity signal is higher as the rotating speed of the magnet 4 increases and lower as the latter decreases. Accordingly, the change in the rotating speed of the magnet 4 is detected by the change in the frequency of the velocity signal.

Figure 3:
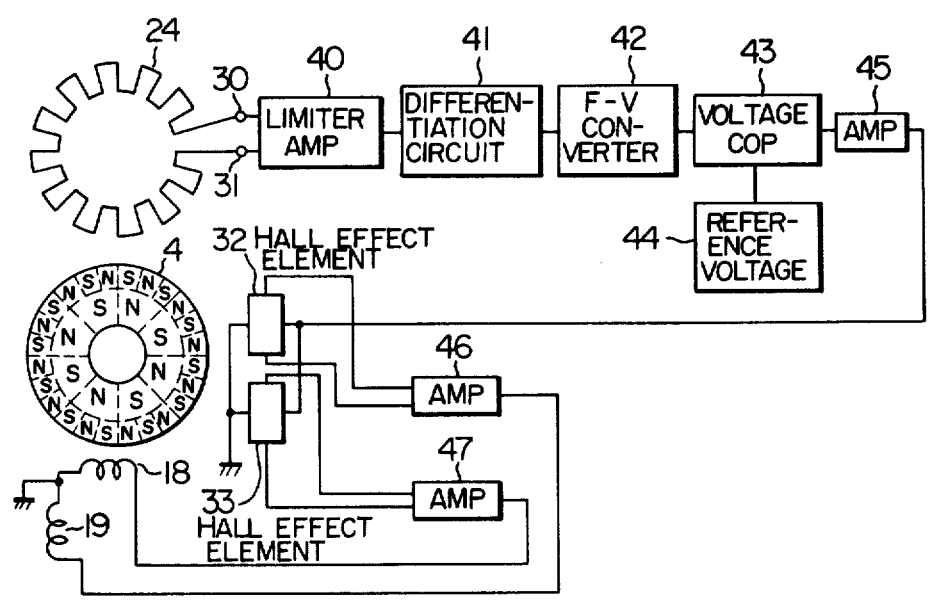
FIG. 3 is a block diagram of a drive circuit for the motor of the present invention.

FIG. 3 shows a block diagram of a drive circuit for the motor of the present invention. In FIG. 3, numeral 40 denotes a limiter amplifier having input terminals connected with the output terminals 30 and 31 of the velocity detecting coil 24 and an output terminal connected to an input terminal of a differentiation circuit 41. The limiter amplifier 40 amplifies the velocity signal generated at the velocity delecting coil 24 and converts the velocity signal into a square wave signal by a saturation region and a cutoff region of the amplifier 40. The differentiation circuit 41 receives the output signal of the amplifier 40 and differentiates it for conversion to positive and negative pulses. The output signal of the differentiation circuit 41 is supplied to a frequency-voltage converter 42 which produces a D.C. voltage proportional to the frequency of the output pulse signal of the differentiation circuit 41. It may comprise a monostable multivibrator and a low-pass filter, in which the state of the monostable multivibrator is inverted by the output pulse signal of the differentiation circuit 41 and a resulting square wave output signal is filtered by the low-pass filter to produce a D.C. voltage proportional to the frequency of the output pulse signal of the differentiation circuit 41. Accordingly, as the frequency of the velocity signal increases, a duty factor of the monostable multivibrator increases and the D.C. voltage rises, and as the frequency of the velocity signal lowers, the duty factor of the monostable multi-vibrator decreases and the D.C. voltage falls. The output voltage of the frequency-voltage converter 42 is supplied to a voltage comparator 43 which compares the output voltage of the frequency-voltage converter 42 with a D.C. voltage from a reference voltage source 44 to produce an error voltage, which is then supplied to an amplifier 45 to control an output current of the amplifier 45.

The output current of the amplifier 45 is supplied to the pair of Hall effect elements 32 and 33 to control output voltages of the Hall effect elements 32 and 33. The output voltage of each of the Hall effect elements 32 and 33 is proportional to a current supplied thereto and a magnetic flux density of the magnetic flux acting thereon. Since the Hall effect elements 32 and 33 are arranged within the magnetic field of the driving magnetic poles 6, 7, 8, . . . 9 of the magnet 4, they are affected by the magnetic flux densities and polarities of the driving magnetic poles 6, 7, 8, . . . 9. Consequently, the output voltages of the Hall effect elements 32 and 33 are A.C. voltages which alternately produce positive and negative output voltages depending on the polarities of the driving magnetic poles 6, 7, 8, . . . 9. Those output voltages are supplied to driving amplifiers 46 and 47, respectively, which are low frequency power amplifiers to power-amplify the output voltages of the Hall effect elements 32 and 33, respectively. An output current from the amplifier 46 is supplied to the driving coil 18 while an output current from the amplifier 47 is supplied to the driving coil 19. Since the output voltages of the Hall effect elements 32 and 33 are controlled by the output current of the amplifier 45 and the driving currents supplied to the driving coils 18 and 19 are controlled by the output voltages of the Hall effect elements 32 and 33, the rotating speed of the magnet 4 is controlled such that the error voltage which is the output voltage of the comparator 43 reaches zero. In this manner, the rotating speed of the magnet 4 is maintained constant.

Since the output signal of the velocity detecting coil 24 is supplied to the low-pass filter connected to the frequency-voltage converter, it is necessary to reduce a time constant of the low-pass filter to attain faster response speed of the velocity control circuit. To this end, it is necessary to raise the frequency of the output signal of the velocity detecting coil 24 when the magnet 4 is rotating at the normal rotating speed. In order to raise the frequency of the velocity signal, the number of the generating element wires 26, 27, 28, . . . 29 which constitute the velocity detecting coil 24 may be increased. However, when the number of the generating element wires 26, 27, 28, . . . 29 is increased, the spacing between adjacent generating element wires becomes so narrow that the adjacent generating element wires may simultaneously traverse the magnetic flux, resulting in the reduction of the output voltage of the velocity signal.

The magnet 4 in the motor shown in FIGS. 1 and 2 has the driving magnetic poles 6, 7, 8, . . . 9 and the velocity detecting magnetic poles 10, 11, 12, . . . 13. Since the number of the velocity detecting magnetic poles 10, 11, 12, . . . 13 is much larger than the number of the driving magnetic poles 6, 7, 8, . . . 9 and the area of each of the velocity detecting magnetic poles 10, 11, 12, . . . 13 is small, there is no risk of adjacent generating element wire's simultaneously traversing the magnetic flux of one velocity detecting magnetic pole even though the number of the generating element wires 26, 27, 28, . . . 29 is increased to reduce the spacing between adjacent generating element wires. Accordingly, the frequency of the velocity signal can be raised. In an actual example where 200 velocity detecting magnetic poles are magnetized in the direction of the thickness of a disk-shaped ferrite core having a diameter of 93 mm, around an outer periphery thereof and 200 generating element wires are used to constitute the velocity detecting coil, the frequency of the velocity signal is 55.55 Hz when the rotor magnet is rotated at 33⅓ r.p.m. and 75 Hz when the latter is rotated at 45 r.p.m.

We claim:

1. A motor comprising:
   a disk-shaped rotor magnet attached to a rotary shaft;
   a plurality of driving magnetic poles segmented circumferentially of said rotor magnet and magnetized in the direction of the thickness of said rotor magnet;
   a plurality of velocity detecting magnetic poles segmented circumferentially of said rotor magnet concentrically to said driving magnetic poles and magnetized in the direction of the thickness of said rotor magnet, the number of magnetic poles of said velocity detecting magnetic poles being larger than the number of magnetic poles of said driving magnetic poles;
   a yoke plate disposed to be spaced from and face said rotor magnet to define a magnetic gap between said rotor magnet and said yoke plate, said yoke plate rotatably supporting said rotary shaft;
   a pair of driving coils disposed within said magnetic gap to interlink with magnetic fluxes of said driving magnetic poles of said rotor magnet; and
   a velocity detecting coil disposed within said magnetic gap to interlink with magnetic fluxes of said velocity detecting magnetic poles of said rotor magnet.

2. A motor comprising:
   a disk-shaped rotor magnet attached to a rotary shaft;
   a plurality of driving magnetic poles segmented circumferentially of said rotor magnet and magnetized in the direction of the thickness of said rotor magnet with each magnetic pole being magnetized in opposite polarity to adjacent magnetic poles;
   a plurality of velocity detecting magnetic poles segmented circumferentially of said rotor magnet concentrically to said driving magnetic poles and magnetized in the direction of the thickness of said rotor magnet with each magnetic pole being magnetized in opposite polarity to adjacent magnetic poles, the number of magnetic poles of said velocity detecting magnetic poles being larger than the number of magnetic poles of said driving magnetic poles;

a yoke plate dispoed to be spaced from and face said rotor magnetic to define a magnetic gap between said rotor magnet and said yoke plate, said yoke plate rotatably supporting said rotary shaft;

a pair of drive coils disposed within said magnetic gap to interlink with magnetic fluxes of said driving magnetic poles of said magnet; and a velocity detecting coil having a plurality of series-connected generating element wires radially disposed within said magnetic gap to interlink with magnetic fluxes of said velocity detecting magnetic poles of said rotor magnet.

3. A motor according to claim 2, wherein said velocity detecting coil has the plurality of series-connected generating element wires which are equal in number to the number of magnetic poles of said velocity detecting magnetic poles of said rotor magnet.

4. A motor comprising:

a rotary shaft;

a yoke plate for rotatably supporting said rotary shaft;

a rotor magnet attached to said rotary shaft and spaced from said yoke plate to define a magnetic gap between said yoke plate and said rotor magnet;

a plurality of driving magnetic poles segmented circumferentially of said rotor magnet and magnetized in the direction of the thickness of said rotor magnet with each magnetic pole being magnetized in opposite polarity to adjacent magnetic poles;

a plurality of velocity detecting magnetic poles segmented circumferentially of said rotor magnet concentrically to said driving magnetic poles around an outer periphery of said driving magnetic poles and magnetized in the direction of the thickness of said rotor magnet with each magnetic pole being magnetized in opposite polarity to adjacent magnetic poles, the number of magnetic poles of said velocity detecting magnetic poles being larger than the number of magnetic poles of said driving magnetic poles;

a pair of drive coils disposed within said magnetic gap to interlink with magnetic fluxes of said driving magnetic poles of said rotor magnet; and a velocity detecting coil having a plurality of series-connected generating element wires radially disposed within said magnetic gap to interlink with magnetic fluxes of said velocity detecting magnetic poles of said rotor magnet.

5. A motor comprising:

a disk-shaped rotor magnet attached to a rotary shaft;

a plurality of driving magnetic poles segmented circumferentially of said rotor magnet and magnetized in the direction of the thickness of said rotor magnet with each magnetic pole being magnetized in opposite polarity to adjacent magnetic poles;

a plurality of velocity detecting magnetic poles segmented circumferentially of said rotor magnet concentrically to said driving magnetic poles around an outer periphery of said driving magnetic poles and magnetized in the direction of the thickness of said rotor magnet with each magnetic pole being magnetized in opposite polarity to adjacent magnetic poles, the number of magnetic poles of said velocity detecting magnetic poles being larger than the number of magnetic poles of said driving magnetic poles;

a yoke plate disposed to be spaced from and face said rotor magnet to define a magnetic gap between said rotor magnet and said yoke plate, said yoke plate rotatably supporting said rotary shaft;

a pair of driving coils disposed within said magnetic gap to interlink with magnetic fluxes of said driving magnetic poles of said rotor magnet;

a velocity detecting coil having a plurality of series-connected generating element wires radially disposed within said magnetic gap to interlink with magnetic fluxes of said velocity detecting magnetic poles of said rotor magnet; and a pair of Hall effect elements disposed within said magnetic gap to interlink with the magnetic fluxes of said driving magnetic poles of said rotor magnet.

6. A motor according to claim 1, wherein each magnetic pole of said driving magnetic poles is magnetized in opposite polarity to adjacent magnetic poles, said plurality of velocity detecting magnetic poles being segmented circumferentially of said rotor magnet concentrically to said driving magnetic poles around an outer periphery of said driving magnetic poles with each magnetic pole of said velocity detecting magnetic poles being magnetized in opposite polarity to adjacent magnetic poles, said pair of driving coils being star-shaped driving coils being angularly disposed from each other by an electric angle of 90°, and said velocity detecting coil having a plurality of series-connected generating element wires radially disposed within said magnetic gap to interlink with magnetic fluxes of said velocity detecting magnetic poles.

7. A motor according to claim 6, further comprising a pair of Hall effect elements disposed within said magnetic gap and angularly displaced from each other by an electrical angle of 90°, said pair of Hall effect elements being interlinked with the magnetic fluxes of said driving magnetic poles of said rotor magnetic for developing output voltage thereacross in the polarities determined by the polarities of said driving magnetic poles of said rotor magnet, and means for supplying said output voltage of said pair of Hall effect elements to said pair of driving coils, respectively.

8. A motor comprising:

a disk-shaped rotor magnet attached to a rotary shaft;

a plurality of driving magnetic poles segmented circumferentially of said rotor magnet and magnetized in the direction of the thickness of said rotor magnet;

a plurality of velocity detecting magnetic pole means segmented circumferentially of said rotor magnet concentrically to said driving magnetic poles and magnetized in the direction of the thickness of said rotor magnet;

a yoke plate disposed to be spaced from and facing said rotor magnet to define a magnetic gap between said rotor magnet and said yoke plate, said yoke plate rotatably supporting said rotary shaft;

a pair of driving coils disposed within said magnetic gap to interlink with magnetic fluxes of said driving magnetic poles of said rotor magnet; and a velocity detecting coil means disposed within said magnetic gap and having a plurality of series-connected generating element wires radially disposed within said magnetic gap to interlink with magnetic fluxes of said velocity detecting magnetic pole means of said rotor magnet and for providing an output signal indicative of the velocity of said motor, said plurality of velocity detecting magnetic pole means enabling said velocity detecting coil means to provide a more accurate velocity output signal without increasing the number of said plurality of series-connected generating element wires, and wherein said plurality of velocity detecting magnetic pole means is provided with a number of magnetic poles larger than the number of magnetic poles of said driving magnetic poles.

9. A motor according to claim 8, wherein said plurality of velocity detecting magnetic pole means includes magnetic provided poles concentrically to said driving magnetic poles around an outer periphery of said driving magnetic poles with each magnetic pole of said velocity detecting magnetic pole means being magnetized in opposite polarity to adjacent magnetic poles.

* * * * *